United States Patent
Henry et al.

(10) Patent No.: US 6,316,569 B1
(45) Date of Patent: Nov. 13, 2001

(54) SELF-LIGHT-STABILIZED PHOTOCHROMIC POLYMER, ITS PREPARATION AND ARTICLES CONTAINING SAME

(75) Inventors: David Henry, Morigny/Champigny; Xavier Lafosse, Fif-sur-Yvette, both of (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/402,598

(22) PCT Filed: Mar. 30, 1998

(86) PCT No.: PCT/US98/06248
  § 371 Date: Oct. 4, 1999
  § 102(e) Date: Oct. 4, 1999

(87) PCT Pub. No.: WO98/45341
  PCT Pub. Date: Oct. 15, 1998

(30) Foreign Application Priority Data
  Apr. 4, 1997 (FR) .................................................. 97 01428

(51) Int. Cl.⁷ .................................................. C08F 126/00
(52) U.S. Cl. ...................... 526/312; 526/321; 526/323.2; 526/324; 526/325; 526/326; 526/329.2; 526/329.5; 526/329.6; 526/333; 526/347
(58) Field of Search .................................... 526/312, 321, 526/323.2, 324, 325, 326, 329.2, 329.5, 329.6, 333, 347

(56) References Cited

U.S. PATENT DOCUMENTS

| | | |
|---|---|---|
| 3,322,542 | 5/1967 | Ullman et al. . |
| 3,914,510 | 10/1975 | Glanz et al. .......................... 428/411 |
| 4,710,281 * | 12/1987 | Guioth et al. ...................... 204/181.7 |
| 4,720,356 | 1/1988 | Chu ....................................... 252/586 |
| 5,110,881 | 5/1992 | McBain et al. ....................... 525/455 |
| 5,266,447 | 11/1993 | Takahashi et al. ................... 430/345 |
| 5,391,327 | 2/1995 | Ligas et al. ........................... 252/586 |

* cited by examiner

*Primary Examiner*—Helen L. Pezzuto
(74) *Attorney, Agent, or Firm*—Angela N. Nwaneri; Peter Rogalskyj

(57) ABSTRACT

The objects of the present invention are:
  a self-light-stabilized photochromic thermoplastic or thermoreticulated polymer carrying non-cyclic tertiary amide-functionalized pendant groups;
  its preparation method;
  photochromic articles constituted, wholly or in part of such a polymer.

Said polymer is obtained advantageously by radical co-polymerization of a composition containing an effective amount of at least one monomer of the formula:

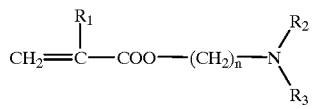

in which:
  $R_1$ is hydrogen or a methyl group;
  n is 2 or 3;
  $R_2$ and $R_3$ are identical or different and represent independently a methyl or ethyl group; and are advantageously identical;
said monomer providing said photostabilizing non-cyclic tertiary amine-functionalized pendant groups.

29 Claims, No Drawings

SELF-LIGHT-STABILIZED PHOTOCHROMIC POLYMER, ITS PREPARATION AND ARTICLES CONTAINING SAME

The present application is 371 of PCT/US98/06248, filed Mar. 30, 1998, which claims the benefit of French Patent Application No. 97 04128, filed Apr. 4, 1997.

Objects of the presently claimed invention are:

- a novel type of self-light-stabilized photochromic polymer;
- photochromic articles constituted wholly or in part of said novel type of polymer;
- the preparation of this novel type of polymer.

There exists today various types of photochromic polymers, proposed notably for ophthalmic applications, whose polymer matrix includes at least one photochromic coloring agent. Said photochromic coloring agents generally consist of spiropyrans, spiroxazines or chromenes. They may intervene in combination. The intervention of spiroxazines in combination with one or more chromenes has notably been recommended.

The phenomenon of aging, of photo-fatigue of these photochromic polymers (they gradually loose their photochromic properties) is well-known to the person skilled in the art. With reference to this phenomenon, it has already been proposed to add various types of products into the matrices of said polymers in order to thus improve their resistance to photo-fatigue, i. e. to photostabilize them. It has thus been recommended:

- to add, amongst others, tertiary amines in formulations containing spiropyrans (see U.S. Pat. Nos. 3,322,542 and 3,914,510) or spiroxazines (see U.S. Pat. No. 5,266,447);
- to add sterically hindered amines in formulations containing spiroxazines (see U.S. Pat. No. 4,720,356). Said amines are known under the designation "HALS" (Hindered Amine Light Stabilizers);
- to add a combination of such sterically hindered amines (HALS) and an asymmetric diaryloxalamide in formulations containing a spiroxazine(s)/chromene(s) combination (see U.S. Pat. No. 5,391,327).

These amines, proposed as photostabilizers for photochromic polymers, are generally of a heterocycle-based complex chemical structure and most of them intervene free, dispersed within the matrix of said polymers.

The Applicant presently proposes an original solution to this technical problem of the photostabilization of said photochromic polymers. The Applicant in fact proposes the original intervention of original stabilizers. Said stabilizers, as shall be specified hereinafter, are monomers or oligomers which are active via non-cyclic tertiary amine groups and they intervene chemically bound to the polymer matrix. They are added prior to the development of said polymer matrix by radical polymerization and they intervene, as co-monomer or co-oligomer, in said radical polymerization. They are known chemical compounds proposed for an original use as photochromic polymer photostabilizers. Said photochromic polymers which incorporate them in their structure, in their carbon skeleton, constitute the first object of the present invention.

In other words, the first object of the present invention is photochromic polymers which carry non-cyclic tertiary amine-functionalized pendant groups. Said polymers are photochromic insofar as their matrix includes at least one photochromic coloring agent. (With reference to a preferred class of polymers of the invention, precisions on such photochromic coloring agents which may intervene in a general manner shall be given further on in the present text). Said thermoplastic or thermoreticulated polymers are self-stabilized insofar as the stabilizers that they contain are chemically bound to their matrix, insofar as said stabilizers constitute a part of their matrix. Furthermore, said stabilizers are thus homogeneously distributed.

Within the context of a preferred variant of the invention, at least some of said non-cyclic tertiary amine-functionalized pendant groups (namely all of them) are of the [di(substituted)amino][$(C_2-C_3)$alkyl]carboxy type:

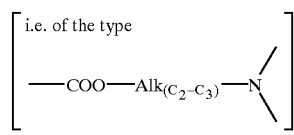

i.e. of the type
$$-COO-Alk_{(C_2-C_3)}-N\begin{matrix}/\\\backslash\end{matrix}$$

and advantageously of the [di($C_1-C_2$)alkylamino][linear ($C_2-C_3$)alkyl]carboxy type:

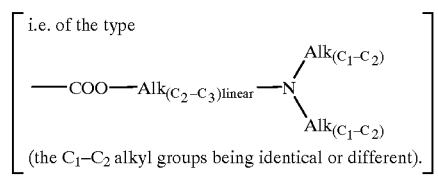

i.e. of the type
$$-COO-Alk_{(C_2-C_3)\text{linear}}-N\begin{matrix}Alk_{(C_1-C_2)}\\ Alk_{(C_1-C_2)}\end{matrix}$$
(the $C_1-C_2$ alkyl groups being identical or different).

It has already been specified above that the photochromic polymers of the invention are thermoplastic ones or thermoreticulated ones. It is possible for the large majority of them to be obtained by radical co-polymerization of a composition including acrylic and/or methacrylic and/or alkenyl, notably vinylic or allylic, monomers and/or oligomers. Such compositions are described in more detail further on in the present text. Characteristically, in order to generate the polymers of the invention, said compositions contain an effective amount of at least one monomer and/or oligomer having a non-cyclic tertiary amine function in its formula.

Within the context of an advantageous variant of the invention, said compositions contain an effective amount of a monomer of the following formula:

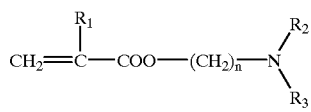

$$CH_2=\underset{R_1}{C}-COO-(CH_2)_n-N\begin{matrix}R_2\\ R_3\end{matrix}$$

in which:

$R_1$ is hydrogen or a methyl group;

n is 2 or 3;

$R_2$ and $R_3$, identical or different, represent independently a methyl or ethyl group; and are advantageously identical.

Said monomer is particularly preferably of the following formula:

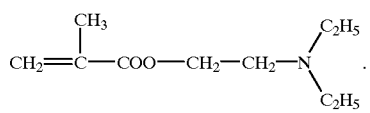

$$CH_2=\underset{CH_3}{C}-COO-CH_2-CH_2-N\begin{matrix}C_2H_5\\ C_2H_5\end{matrix}$$

It is a matter of diethylaminoethylmethacrylate or DEAEMA.

Generally, the monomers and/or oligomers which intervene characteristically in the context of the present invention have in their formula, on the one hand, a non-cyclic tertiary amine function (photostabilizing function), and on the other hand, a function which is reactive in the sense of the radical polymerization which generates the stabilized photochromic polymer. Said reactive function is generally of the acrylic, methacrylic or alkenyl type, notably vinylic or allylic. The reactive function co-polymerizes with the reactive functions of the various constituents of the polymer matrix, reactive functions which are generally of the same type (vide supra).

It has been indicated above that said monomers and/or oligomers (having at least one non-cyclic tertiary amine function in their structure) intervene in an effective amount. This amount is generally between 0.05 and 5% by weight, and advantageously between 0.2 and 0.6% by weight of the weight of the composition to be polymerized.

It is now proposed to describe a preferred variant of polymers of the invention in greater detail. Said preferred polymers are obtained by radical co-polymerization of a composition containing:

(a) at least one monomer of formula (I):

in which R=H or $CH_3$ and m and n are independently 1 or 2;

(b) at least one aromatic monovinyl monomer of formula (II):

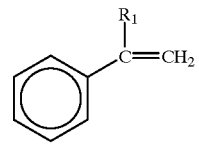

in which $R_1$=H or $CH_3$; said monovinyl monomer advantageously consisting of styrene;

(c) an effective amount of at least one photochromic coloring agent conferring photochromic properties to said polymer; said coloring agent being selected from the group consisting of spiroxazines, spiropyrans and chromenes, and advantageously consisting of at least one spiroxazine, of at least one chromene, or a mixture of spiroxazine(s)/chromene(s);

(d) an effective amount of at least one monomer and/or oligomer having at least one non-cyclic tertiary amine function in its formula; said monomer advantageously being of the formula below:

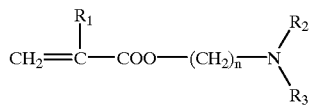

in which:
$R_1$ is hydrogen or a methyl group;
n is 2 or 3;
$R_2$ and $R_3$ are identical or different and represent independently a methyl or ethyl group; and are advantageously identical.

Said composition generally further contains an effective amount of at least one chain transfer agent and an effective amount of at least one radical polymerization initiator. The composition may also further contain:

(e) at least one aromatic divinyl monomer of formula (III):

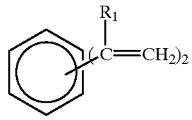

in which $R_1$=H or $CH_3$;
said divinyl monomer advantageously consisting of divinylbenzene, and/or (f) at least one (meth)acrylic monomer of formula (IV):

$$CH_2=C(R)-COOR'$$

in which R=H or $CH_3$ and R' is a straight-chain or branched alkyl radical having from 4 to 16 carbon atoms, an optionally substituted (generally by a $C_1$–$C_6$ alkyl group) methylphenyl or methylphenoxy radical or polyoxyethoxylated group of formula:

$$-(CH_2-CH_2-O)_nR''$$

in which n is an integer between 1 to 10 and R"=$CH_3$ or $C_2H_5$;

said (meth)acrylic monomer advantageously consisting of ethylhexylmethacrylate, and/or at least one plasticizer, advantageously selected from the phthalates and even more advantageously selected from the sterically hindered saturated phthalates such as dibutylphthalate and dioctyl(tere)phthalate, and the unsaturated phthalates having one or two substituents such as diallylphthalate, and/or an effective amount of at least one non-photochromic coloring agent in the hypothesis wherein it is desired to confer a base tint to the material.

The nature and amount of each of the intervening compounds, or compounds which can intervene in the composition of the preferred polymer of the invention, shall now be examined in greater detail.

The monomers (a) of formula (I) are well-known and are commercially available. It is noted that it is a matter of first monomers of formula (A) in the sense of the WO-A-92/05209 document. The monomer of formula (I) in which R=H and m=n=2 is particularly preferred. Said monomer is notably marketed by AKZO NOBEL (NL), under the commercial designation DIACRYL 121.

The monomers of formula (I) generally intervene in the composition to be polymerized at a rate of 50 to 90% by weight. If they intervene in too low an amount, the polymerizable composition (or matrix) tends to shrink during its polymerization, inducing a premature turning-out of the mold which is itself responsible for a deterioration of the optical properties of the final material. If they intervene in too great an amount, it is also observed that the final material has mediocre optical properties.

The aromatic monovinyl monomers (b) of formula (II) (styrene and/or methylstyrene) intervene in combination with the monomers of formula (I) in order to loosen the polymer network. This intervention of styrene is particularly advantageous insofar as this polymerized compound has a rather high refractive index (n=1.595). Said styrene constitutes the particularly preferred compound of this class of monomers. Said monomers of formula (II) generally intervene in the composition to be polymerized at the rate of 5 to 40% by weight, advantageously at the rate of 8 to 30% by weight. If they intervene in too low an amount, no expected effect of the tensions within the matrix are observed (birefringence phenomena are observed . . . ); a matrix is also obtained which has a low refractive index. If they intervene in too great an amount, it is observed that the matrix tends to stick to the mold during the polymerization and a decrease in the photochromic properties (above all kinetically) is also observed.

The preferred polymers of the invention, insofar as it is a matter of (stabilized) photochromic materials, further contain an effective amount of at least one photochromic coloring agent (c) in their matrix. Said coloring agent is selected from spiropyrans, spiroxazines and chromenes (or a combination thereof) which are endowed with photochromic properties. Very many photochromic coloring agents of this type are described in the literature and are available commercially.

Spiroxazine coloring agents, which may be used in the context of the present invention, have notably been described in the following patents: U.S. Pat. Nos. 3,562,172, 4,634,767, 4,637,968, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345, in the applications EP-A-0 508 219, 0 232 295 and 0 171 909 and in the application FR-A-2 738 248 (of the Applicant).

It is most particularly recommended, within the context of the present invention, to use 1,3-dihydro-1,3,3-trimethyl-6'-(piperidino)spiro[2H-indole-2,3'-3H-naphtho[2,1b][1,4]oxazine], referenced SPO3 in the examples hereinafter, as well as the use of the spiroxazines described in the application FR-A-2 738 248.

Chromene coloring agents which may be used within the context of the present invention are notably described in the patents U.S. Pat. Nos. 3,567,605, 4,889,413, 4,931,221, 5,200,116, 5,066,818, 5,224,602, 5,238,981, 5,106,998, 4,980,089, 5,130,058, and the application EP-A-0 562 915. Said chromenes may notably consist of naphthopyrans.

It is most particularly recommended, in the context of the present invention, to use 2,2-bis(4'-methoxyphenyl)-5,6-dimethyl-2H-naphtho[1,2b]pyran, referenced CRO1 in the examples hereinafter.

Spiropyran coloring agents which may be used within the context of the present invention are notably described in the following books:

PHOTOCHROMISM G. Brown, Editor—Techniques of Chemistry—Wiley Interscience—Vol.III—1971—Chapter III—Pages 45–294—R. C. Bertelson.

PHOTOCHROMISM—Molecules & Systems—Edited by H. Dürr—H. Bouas-Laurent—Elsevier 1990—Chapter 8: Spiropyrans—Pages 314–455—R. Guglielmetti.

The teachings of all these documents are incorporated herein by reference.

Within the context of the present invention, the intervention of spiroxazines and/or chromenes is much more preferred than those of spiropyrans.

As an indication and by no means as a limitation, it is herein indicated that said photochromic coloring agents generally intervene in the compositions to be polymerized (and polymerized compositions) of the invention at the rate of 0.01 to 1% by weight, advantageously at the rate of 0.05 to 0.5% by weight with respect to the weight of the monomers.

It has been indicated that the compositions of the invention contain an effective amount of at least one photochromic coloring agent. It is in fact frequent, within the context of the present invention, to bring about a combination of photochromic coloring agents with the aim of obtaining at the darkened state a specific tint, notably gray or brown. Within the context of particularly preferred variants of the present invention, the intervening photochromic filler comprises a spiroxazine(s)/chromene(s) combination. Such a composition may notably contain two spiroxazines and two chromenes.

Said photochromic coloring agents may themselves very well contain a polymerizable and/or cross-linkable reactive group in their chemical formula. They themselves then intervene (just as the stabilizers which are <<associated>> to them), as co-monomers in the composition to be polymerized, and are chemically bound, grafted to the matrix of said polymerized composition. Generally, the polymers of the invention, notably those obtained from monomers (a) and (b) specified above, contain their photochromic coloring agent(s), free or bound to their matrix.

The composition of the preferred polymers of the invention is now reverted to.

Characteristically, the composition contains an effective amount of at least one monomer and/or oligomer having at least one non-cyclic tertiary amine function in its formula (said function being advantageously of the [di(substituted)amino][$(C_2-C_3)$alkyl]carboxy type and particularly preferably of the [di($C_1-C_2$)alkylamino)][linear($C_2-C_3$)alkyl] carboxy type); said monomer advantageously having the following formula:

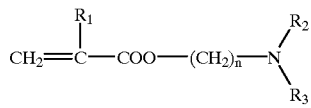

in which:

$R_1$ is hydrogen or a methyl group;

n is 2 or 3;

$R_2$ and $R_3$ are identical or different and represent independently a methyl or ethyl group; and are advantageously identical.

This monomer and/or oligomer which has at least one non-cyclic tertiary amine function in its formula is advantageously such as specified above. It is advantageously DEAEMA. It intervenes advantageously in the amounts indicated: 0.05 to 5% by weight, preferably 0.2 to 0.6% by weight.

The nature and the intervening amounts have been specified above of the principal constituents in the sense of the invention (constituents (a), (b), (c), (d)), of the polymerizable composition from which the preferred photochromic polymers of the invention are obtained. It has already been indicated that other constituents intervene advantageously in this composition (compounds of formula (III) and/or (IV) and/or plasticizer(s)) and that the polymerization reaction is generally carried out in the presence of an effective amount of at least one chain transfer agent and at least one radical polymerization initiator. Its two aspects are specified below.

Said polymerizable composition advantageously contains at least one compound (monomer) of formula (III). Said compound of formula (III) consists of divinylbenzene (DVB) or di(methylvinyl)benzene. Divinylbenzene (DVB)

is the particularly preferred compound of formula (III). The intervention of at least one compound of formula (III) is advantageous notably in that said compound moderates, in a general manner, the effects of the compound of formula (II). The beneficial action of such a compound of formula (III) on the expression of the photochromic properties has notably been demonstrated. With reference to divinylbenzene, insofar as this polymerized compound has a relatively high refractive index (n=1.61), its intervention is equally beneficial in that it brings about an increase in the refractive index of the polymers of the invention.

It is recommended to bring said compound(s) of the invention of formula (III) in at rates which may reach 15% by weight. Beyond this, beneficial effects are no longer observed: the mechanical properties of the material are altered and optical faults are generated. Said compound of formula (III) generally starts to express its beneficial action when it is employed at more than 2% by weight. Thus, it is recommended to generally bring it in between 2 and 15%, advantageously between 2 and 6% by weight.

Said polymerizable composition advantageously contains a plasticizer. Its photochromic properties may be improved by bringing such a plasticizer in. The Applicant has in fact shown in a surprising way that the incorporation of plasticizers (in reasonable amounts) in polymerizable compositions based on monomers of formula (I) and (II) filled with photochromic coloring agent(s), has beneficial effects on the photochromic properties of said compositions without altering their mechanical properties.

Said plasticizer (plasticizer for a polymerized matrix based on compounds of formula (I) and (II)) may notably consist of triphenylphosphate or a phthalate. Advantageously, the composition from which the polymer of the invention is developed comprises at least one phthalate. Said phthalate is in principle selected from the saturated phthalates, advantageously sterically hindered, and unsaturated phthalates having one or two substituents.

When saturated phthalates (at least one saturated phthalate) intervene in the structure of the material of the invention, they are not chemically bound to the polymer matrix insofar as they are not monomers. They are dispersed in said matrix. It is therefore understood that, for problems of stability, it is recommended that sterically hindered phthalates are brought in.

Listed below in a non-limiting manner are saturated phthalates which include two substituents, which intervene advantageously as plasticizer in the polymerizable compositions from which polymers of the invention are obtained. Said phthalates are grouped into three groups.

Linear phthalates: dialkylphthalates, whose alkyl groups, identical or different, generally have from 1 to 12 carbon atoms (and may also have a larger number of carbon); and notably:
dimethylphthalate—diethylphthalate—dibutylphthalate—dihexylphthalate—diheptylphthalate—dioctyl(tere)phthalate—dinonylphthalate—diundecylphthalate—ditridecylphthalate—butyloctylphthalate—undecyl dodecylphthalate.

Hindered phthalates: dialkylphthalates, of the same type as those indicated above, of which at least one of the alkyl groups is branched; and notably:
diisobutylphthalate—diisoheptylphthalate—diisooctylphthalate—diisononylphthalate—diisodecylphthalate—di(2-ethylhexyl)phthalate—di(1-methylheptyl)phthalate or dialkylcycloalkylphthalates—dicycloalkylphthalates—dialkylphenylalkylphthalates and diphenylalkylphthalates (whose alkyl groups, as indicated above, generally have from 1 to 12 carbon atoms); and notably:
cyclohexyl isooctylphthalate—dicyclohexylphthalate—butylcyclohexylphthalate—butylbenzylphthalate.

Other phthalates: and notably phthalates substituted with alkoxy groups, whose alkyl groups generally have from 1 to 12 carbon atoms, such as:
dimethoxyethylphthalate—dibutoxyethylphthalate—dibutoxyethoxyethylphthalate.

As saturated phthalate, it is most particularly preferred to bring in butylphthalate (DBP) and/or dioctylphthalate (DOP), notably in the form of dioctylterephthalate.

When unsaturated phthalates (at least one unsaturated phthalate) intervene in the structure of the polymers of the invention, they are chemically bound to the polymer matrix insofar as their double bond(s) has (have) intervened during the radical polymerization. They have in fact intervened as a monomer. They are found thus perfectly anchored and stabilized in the polymer matrix. It is most particularly recommended to bring in diallylphthalate as an unsaturated phthalate.

The plasticizers which intervene advantageously in the polymerizable composition from which the preferred polymers of the invention are obtained generally intervene at a rate of 1 to 10% by weight. If they intervene in too low an amount their beneficial action on photochromic properties do not manifest themselves. If they intervene in too high an amount, their influence becomes harmful to the mechanical properties.

The polymerizable composition also advantageously contains at least one compound (monomer) of formula (IV). It is a matter of (meth)acrylic monomers such as described above. It may notably be a matter of butyl, pentyl, hexyl, heptyl, octyl or 2-ethylhexyl(meth)acrylate or even ethyltriglycol(meth)acrylate. 2-Ethylhexylmethacrylate (EHMA) is the preferred compound of formula (IV). The presence of this type of compound proves notably to be advantageous for the turning-out of the polymerized material and for carrying out the finishing treatments of the latter.

The intervention of this type of monomer, whose presence has the disadvantage of lowering the refractive index, is generally limited to 20% by weight.

The expected beneficial effect generally manifests itself from the intervention of a few percent by weight. It is therefore generally recommend to bring in this type of compound at a rate of 4 to 15% by weight.

As specified above, the intervention of the compounds of formula (III) and/or (IV) and/or plasticizer(s) is not essential. It proves nevertheless to be advantageous. Within the context of the invention, a certain synergic effect has been demonstrated, on the photochromic properties of the plasticizer and of the compound of formula (III).

The compounds of formula (I), (II), (III), (IV) and the plasticizer(s) are the principal constituents (insofar as they intervene or are able to intervene in relatively consistent amounts) of the compositions from which the polymers of the invention are generated. Said polymers are obtained from said compounds (monomers) by a classical radical co-polymerization per se. Said radical co-polymerization is generally carried out as specified above in the presence of an effective amount of at least one chain transfer agent and of at least one radical polymerization initiator. The radical co-polymerization is characteristically carried out in the presence of at least one monomer and/or oligomer which has at least one non-cyclic tertiary amine function in its formula.

The chain transfer agent generally intervenes at a maximal content of 5% by weight, advantageously at a rate of 0.01 to 2% by weight, compared to the weight of the monomers to be co-polymerized. It is noted here that it is possible to do away with the presence of such a chain transfer agent in the hypothesis where the material is prepared under a reduced thickness (e≦2.0 mm). In this hypothesis, problems of release of heat are not met . . . In order to prepare a material of the invention having a thickness of greater than 2.0 mm, the presence of a chain transfer agent in the amounts indicated above is almost essential. It is highly inadvisable to go over the maximal content of 5% indicated above since then the glass transition temperature of the material prepared becomes much too low. It is highly recommended, for the preparation of material (lens) of a thickness between 1.5 and 20 mm, a chain transfer agent content of about 1.2%. It was noted that the colorability and the darkening kinetics of the material of the invention increases with the quantity of intervening chain transfer agent In the same way, when this amount increases, the mechanical resistance increases and the optical qualities improve . . .

It is obviously convenient that said chain transfer agent should not destroy the photochromic coloring agent(s) present during the polymerization and/or should not induce from its (their) own right a discoloration of the material. Such harmful phenomena have been noticed by the Applicant when halogenated chain transfer agents were employed. Within the context of the invention, it is therefore recommended to bring in non-halogenated chain transfer agents.

It is most particularly recommended to bring in at least one (non-halogenated) chain transfer agent selected from the linear alkane thiols and bis-mercaptoethyl ether. Said linear alkane thiols generally have from 2 to 18 carbon atoms, advantageously from 4 to 16 carbon atoms. Specific examples of such linear alkane thiols are butanethiol, pentanethiol, hexanethiol, heptanethiol, octanethiol, decanethiol, dodecanethiol and tetradecanethiol.

It is highly recommended to use dodecanethiol.

It is not excluded to use other types of chain transfer agents such as alkane thiols (of the above type) substituted with at least one aryl or alkyl radical or thiophenols.

Regarding bis-mercaptoethyl ether, its formula, to all useful ends, is specified below:

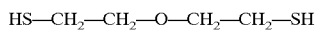

HS—CH$_2$—CH$_2$—O—CH$_2$—CH$_2$—SH

All these compounds are familiar to the person skilled in the art and are commercially available.

The intervening radical polymerization initiator or catalyst must itself as well be <<inert>> towards photochromic coloring agent(s) present. It is for this reason that the Applicant recommends not using initiators of the peroxide type. The Applicant recommends the use of radical polymerization initiator(s) selected from the diazo compounds. These compounds are familiar to the person skilled in the art and are commercially available. Examples of such diazo compounds are azobisisobutyronitrile (AIBN) and 2,2'-azobis(2-methylbutyronitrile) (AMBN), the latter being preferred. The catalyst is generally used at a rate of 0.01 to 1% by weight, preferably at a rate of 0.05 to 0.5% by weight, with respect to the weight of the monomers present. In the absence of such a catalyst or in the presence of too weak an amount of same, it becomes necessary to carry out the co-polymerization at a higher temperature and this renders the reaction difficult to control . . . In the presence of too great an amount of catalyst, an excess of free radicals may be generated, this excess of free radicals inducing a destruction of photochromic coloring agent(s) present and an accelerated fatigue of the final material. In this latter hypothesis, the reaction carried out may also speed up and become difficult to control.

The Applicant has noted that the alkane thiol-type chain transfer agent/diazo compound-type polymerization initiator combination enables obtaining photochromic materials which exhibit excellent photochromic properties.

The materials of the invention, such as described above (capable of being obtained by radical polymerization of a composition containing the ingredients specified above) are photochromic transparent organic materials. It is not excluded from the context of the present invention to bring into said composition to be polymerized, as has been already indicated, an effective amount of at least one non-photochromic coloring agent so that the material resulting from the polymerization has a fixed base tint.

This type of non-photochromic coloring agent is known to the person skilled in the art. Its intervention does not bring about any particular problem.

Within the context of a particularly preferred variant, the claimed polymers (photochromic, self-light-stabilized) can be obtained by radical polymerization of a composition principally containing about:

- 50 to 90% by weight of at least one monomer (a) of formula (I);
- 5 to 40% by weight of at least one monomer (b) of formula (II);
- 0.05 to 5% by weight of at least one monomer and/or oligomer (d) having at least one non-cyclic tertiary amine function in its formula;
- 0 to 10% by weight of at least one plasticizer;
- 0 to 15% by weight of at least one monomer (e) of formula (III);
- 0 to 20% by weight of at least one monomer (f) of formula (IV).

Said composition obviously contains as well an effective amount of at least one photochromic coloring agent.

It has been described above, in general terms and then within the context of a particular variant (polymers based on monomers of formula (I) and (II) . . . namely monomers of formula (I) and (II) and/or (III) and/or (IV) . . . ), the first object of the presently claimed invention: self-light-stabilized photochromic polymers insofar as their structure integrates non-cyclic tertiary amine functionalized pendant groups.

According to another of its objects, the invention relates to photochromic articles constituted wholly or in part of a polymer of the invention.

Non-limiting examples of such articles are ophthalmic corrective lenses, solar lenses (the material contains a non-photochromic coloring agent), glazings for vehicles and buildings . . . In these articles, the photochromic material of the invention may constitute all the thickness of the article (mass article) or may constitute only a stratified film or layer applied onto a support.

Ophthalmic lenses are the preferred articles and may be conveniently produced by carrying out the co-polymerization for example such as described in the U.S. Pat. Nos. 2,242,386, 3,136,000 or 3,881,683.

According to another of its objects, the invention relates to the preparation of a self-light-stabilized photochromic thermoplastic or thermoreticulated polymer comprising the radical co-polymerization of a composition containing an effective amount, as photostabilizer, of at least one monomer and/or oligomer having at least one non-cyclic tertiary amine function in its formula (said function being advantageously of the [di(substituted)amino][(C$_2$–C$_3$)alkyl]carboxy type and, particularly preferred, of the [di(C$_1$–C$_2$) alkylamino][linear(C$_2$–C$_3$)alkyl]carboxy) type; said monomer advantageously being of the following formula:

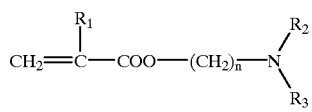

$$CH_2\!\!=\!\!C\!\!-\!\!COO\!\!-\!\!(CH_2)_n\!\!-\!\!N\begin{matrix}R_2\\ \\R_3\end{matrix}$$

with $R_1$ above the C.

in which:

R₁ is hydrogen or a methyl group;

n is 2 or 3;

R₂ and R₃ are identical or different and represent independently a methyl or ethyl group; and are advantageously identical.

In other words, the present invention relates to a particular use of monomers and/or oligomers having at least one non-cyclic tertiary amine function in its formula as well as a polymerization-reactive function.

The polymerization used within the context of the present invention brings in, generally, several types of monomers and/or oligomers. In a particular manner, within the context of the preferred variant described in detail above, it can bring in the following types of monomers (reagents):

(a) those of formula (I);

(b) those of formula (II);

(d) the recommended photostabilizers;

in any case; and advantageously and/or optionally:

(c) at least one photochromic coloring agent having a reactive group in its formula;

(e) those of formula (III);

at least one plasticizer which has a reactive group in its formula;

(f) those of formula (IV).

Said co-polymerization is carried out under the conditions familiar to the person skilled in the art. It generally brings in, as has already been indicated, an effective quantity of at least one chain transfer agent such as defined above (it has been seen that it was possible to do away with the intervention of such an agent in the hypothesis where a photochromic polymer block is prepared of small thickness: $e \leq 2.0$ mm) and an effective amount of a radical polymerization initiator.

The composition to be polymerized may further contain, as is indicated above, various additives and notably a non-photochromic coloring agent.

The invention is illustrated by Examples 1, 2, 3 and 4 hereinafter. Examples 1T, 2T, 3T and 4T are given as comparisons. They relate to control compositions which do not include a photostabilizer in their composition.

All the proportions indicated in said Examples 1 to 4 and 1T to 4T are in parts by weight. It is more specifically indicated for 100 parts by weight of principal monomers (D121, STY, DVB: see further on), the intervening parts by weight of additives of the catalyst type, chain transfer agent type, coloring agent type, photostabilizer type.

Test-tubes of 2 mm thickness have in fact been prepared that have been tested in order to evaluate their photochromic properties. Said test-tubes have been obtained by carrying out the polymerization of the polymerizable composition in an adequate mold under the following conditions: said polymerizable composition is heated gently until the start of a thermal degradation of the catalyst (radical polymerization initiator), degradation which generates free radicals. Once the temperature of 53° C. is reached, it is maintained for 16 hours. After 16 hours, in the space of 3 hours, the temperature is brought to 90° C. This temperature of 90° C. is then maintained for 2 hours. After this thermal treatment, the test-tubes of the material to be tested are obtained by turning-out.

It is noted that the thermal treatment specified above is that carried out by the Applicant for obtaining ophthalmological lenses from polymerizable compositions of the invention, treated in the lens molds.

The starting materials used in the Examples are the following:

| Monomers | |
|---|---|
| DIACRYL 121 from AKZO Chimie (tetraethoxylated Bisphenol A dimethacrylate) | D121 |
| Styrene | STY |
| Divinylbenzene | DVB |
| Diethylaminoethylmethacrylate | DEAEMA |
| Catalyst (radical polymerization initiator) | |
| 2,2'-azobis(2-methylbutyronitrile) | AMBN |
| Chain transfer agent | |
| n-Dodecane-1-thiol | DDT |
| Photochromic coloring agents | |
| Chemical type | Designation |
| Spiroxazine | SPO1* |
| Spiroxazine | SPO2** |
| Spiroxazine | SPO3*** |
| Chromene (napthopyran) | CRO1**** |

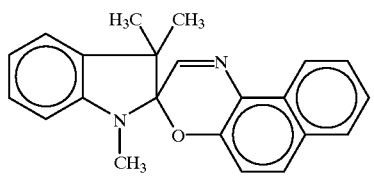

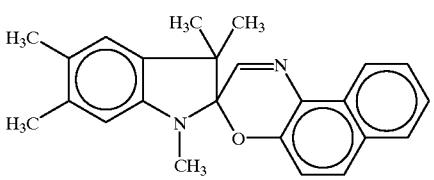

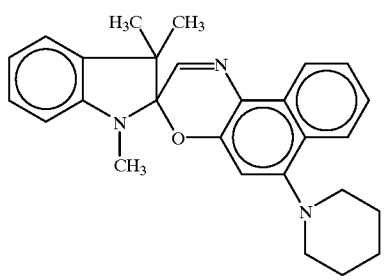

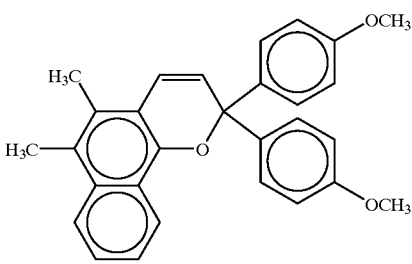

The test-tubes of the material according to the invention Examples 1,2,3, and 4) as well as those of material which do not contain any photostabilizer (Examples 1T, 2T, 3T and 4T) were prepared by polymerizing, under the above conditions, polymerizable compositions whose formulations are specified in the following Table 1.

TABLE 1

| Formulation | Ex 1T | Ex 1 | Ex 2T | Ex 2 | Ex 3T | Ex 3 | Ex 4T | Ex 4 |
|---|---|---|---|---|---|---|---|---|
| D121 | 80 | 80 | 80 | 80 | 80 | 80 | 80 | 80 |
| STY | 20 | 20 | 20 | 20 | 20 | 20 | 15 | 15 |
| DVB | — | — | — | — | — | — | 5 | 5 |
| DEAEMA | — | 0.4 | — | 0.4 | — | 0.4 | — | 0.4 |
| AMBN | 0.2 | 0.2 | 0.2 | 0.2 | 0.2 | 0.2 | 0.2 | 0.2 |
| DDT | 0.5 | 0.5 | 0.5 | 0.5 | 0.5 | 0.5 | 0.9 | 0.9 |
| SPO3 | 0.05 | 0.05 | — | — | — | — | — | — |
| SPO1 | — | — | 0.1 | 0.1 | — | — | — | — |
| SPO2 | — | — | — | — | 0.1 | 0.1 | — | — |
| CRO1 | — | — | — | — | — | — | 0.05 | 0.05 |

The photochromic properties of the materials obtained were evaluated by the slope of the measurement of one or two parameters:
  measurement of the yellow index according to the standard ASTM D 1925-70;
  measurement of the transmission at the $\lambda_{max}$ of the photochromic composition, in the clear state and in the dark state, before and after fatigue. The dark state is obtained by exposing the sample under a xenon lamp (40,000 lux) for 15 minutes. The fatigued state of the sample is obtained by submitting said sample to the conditions of the Suntest, which consists of exposing said sample under a xenon lamp (50,000 lux) for 250 hours.

TABLE 2

| | Transmission at the $\lambda_{max}$ (in %) | | | | Yellow index (standard ASTM) | |
|---|---|---|---|---|---|---|
| | Before fatigue Clear state | 250 h Suntest Clear state | Before fatigue Dark state | 250 h Suntest Dark state | Before fatigue Clear state | 250 h Suntest Clear state |
| Ex 1T | 80 | 76 | 25.5 | 30.4 | — | — |
| Ex 1 | 81 | 79 | 25.5 | 25.5 | — | — |
| Ex 2T | 90 | 90 | 65 | 68 | 7.4 | 8.6 |
| Ex 2 | 90 | 90 | 66 | 67 | 7.9 | 7.9 |
| Ex 3T | 88 | 88 | 49 | 55 | 7 | 9.2 |
| Ex 3 | 88.5 | 88.5 | 47 | 48 | 7.8 | 7.8 |
| Ex 4T | 88 | 83.8 | 28.9 | 37.8 | — | — |
| Ex 4 | 86.7 | 84.6 | 32.9 | 38.8 | — | — |

What is claimed is:

1. A material comprising:
  at least one photochromic coloring agent in an amount effective to confer photochromic properties to said material; and
  a thermoplastic or thermoreticulated polymer carrying non-cyclic tertiary amine-functionalized pendant groups, wherein said non-cyclic tertiary amine-functionalized pendant groups are present in an amount effective to stabilize said at least one photochromic coloring agent's photochromic properties.

2. A material according to claim 1, wherein said polymer is prepared by radical copolymerization of a composition comprising acrylic and/or methacrylic and/or alkenyl monomers and/or oligomers.

3. A material according to claim 2, wherein said composition comprises at least one monomer and/or oligomer having at least one non-cyclic tertiary amine function in its formula.

4. A material according to claim 3, wherein said composition comprises from 0.05 to 5% by weight of said monomer(s) and/or oligomer(s) having at least one non-cyclic tertiary amine function in their formula.

5. A material according to claim 1, wherein said polymer is prepared by radical copolymerization of a composition comprising:
  (a) at least one monomer of formula (I):

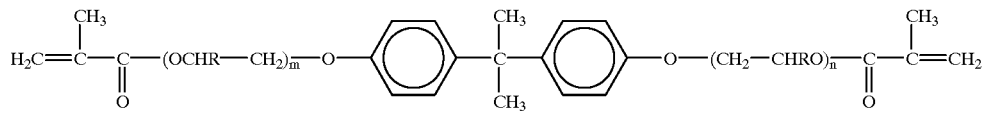

in which R=H or CH$_3$ and m and n are independently 1 or 2;
  (b) at least one aromatic monovinyl monomer of formula (II):

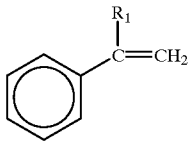

in which R$_1$=H or CH$_3$;
  (c) an effective amount of at least one photochromic coloring agent conferring photochromic properties to said material; said coloring agent being selected from the group consisting of spiroxazines, spiropyrans and chromenes; and
  (d) an effective amount of at least one monomer and/or oligomer having at least one non-cyclic tertiary amine function in its formula.

6. A material according to claim 5, wherein said composition further comprises:
  (e) at least one aromatic divinyl monomer of formula (III):

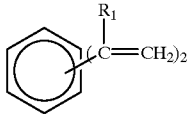

in which R$_1$=H or CH$_3$.

7. A material according to claim 5, wherein said composition further comprises at least one plasticizer.

8. A material according to claim 5, wherein said composition further comprises:
  (f) at least one (meth)acrylic monomer of formula (IV):

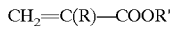

in which R=H or $CH_3$ and R' is a straight-chain or branched alkyl radical having from 4 to 16 carbon atoms, an optionally substituted methylphenyl or methylphenoxy radical or polyoxyethoxylated group of formula:

in which n is an integer between 1 to 10 and R''=$CH_3$ or $C_2H_5$.

9. A material according to claim 5, wherein said composition further comprises at least one non-halogenated chain transfer agent.

10. A material according to claim 5, wherein said composition further comprises at least one diazo radical polymerization initiator.

11. A material according to claim 5, wherein said material further comprises at least one non-photochromic coloring agent.

12. A material according to claim 5, wherein said composition comprises about:
- 50 to 90% by weight of at least one monomer (a) of formula (I);
- 5 to 40% by weight of at least one monomer (b) of formula (II);
- 0.05 to 5% by weight of at least one monomer and/or oligomer (d) having of at least one non-cyclic tertiary amine function in its formula;
- 0 to 10% by weight of at least one plasticizer;
- 0 to 15% by weight of at least one monomer (e) of formula (III); and
- 0 to 20% by weight of at least one monomer (f) of formula (IV).

13. Photochromic article comprising a material according to claim 2.

14. Article according to claim 13, wherein said article is an ophthalmic or solar lens or a glazing for vehicles or buildings.

15. A material according to claim 3, wherein said monomer has the formula below:

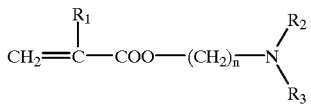

in which:
$R_1$ is hydrogen or a methyl group;
n is 2 or 3;
$R_2$ and $R_3$ are identical or different and represent independently a methyl or ethyl group.

16. A material according to claim 4, wherein said composition comprises from 0.2 to 0.6% by weight of said monomer(s) and/or oligomer(s) having at least one non-cyclic tertiary amine function in their formula.

17. A material according to claim 5, wherein said monomer having at least one non-cyclic tertiary amine function in its formula has the formula below:

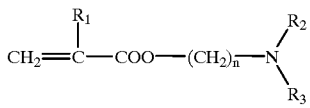

in which:
$R_1$ is hydrogen or a methyl group;
n is 2 or 3;
$R_2$ and $R_3$ are identical or different and represent independently a methyl or ethyl group.

18. A material according to claim 7, wherein said at least one plasticizer is a phthalate.

19. A material according to claim 9, wherein said at least one non-halogenated chain transfer agent is selected from the group consisting of straight chain alkane thiols and bis-mercapto-ethylether.

20. A material according to claim 1, wherein at least some of said non cyclic tertiary amine-functionalized pendant groups are [di(substituted)amino][$(C_2-C_3)$alkyl]carboxy groups.

21. A material according to claim 1, wherein at least some of said non cyclic tertiary amine-functionalized pendant groups are [di($C_1-C_2$)alkylamino][$(C_2-C_3)$ linear alkyl] carboxy groups.

22. Method for preparing a self-light-stabilized photochromic material, said method comprising:
providing a composition which comprises at least one monomer and/or oligomer having at least one non-cyclic tertiary amine function in its formula and which comprises at least one photochromic coloring agent in an amount effective to confer photochromic properties to the material; and
radically polymerizing the composition.

23. Method according to claim 22, wherein said monomer having at least one non-cyclic tertiary amine function in its formula has the formula below:

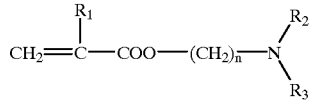

in which:
$R_1$ is hydrogen or a methyl group;
n is 2 or 3;
$R_2$ and $R_3$ are identical or different and represent independently a methyl or ethyl group.

24. A polymerizable composition which comprises:
at least one monomer and/or oligomer carrying at least one non-cyclic tertiary amine-functionalized pendant group in its formula; and
at least one photochromic coloring agent in an amount effective to confer photochromic properties to the polymerizable composition's polymerization product, wherein said non-cyclic tertiary amine-functionalized pendant group is present in an amount effective to stabilize said at least one photochromic coloring agent's photochromic properties.

25. A polymerizable composition according to claim 24, wherein at least some of said non cyclic tertiary amine-functionalized pendant groups are [di(substituted)amino] [$(C_2-C_3)$alkyl]carboxy groups.

26. A polymerizable composition according to claim 24, wherein at least some of said non cyclic tertiary amine-functionalized pendant groups are [di($C_1-C_2$)alkylamino] [$(C_2-C_3)$ linear alkyl]carboxy groups.

27. A polymerizable composition according to claim 24, wherein said at least one monomer and/or oligomer is a monomer having the formula below:

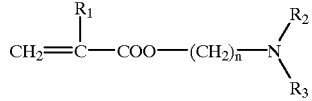

in which:
$R_1$ is hydrogen or a methyl group;
n is 2 or 3;
$R_2$ and $R_3$ are identical or different and represent independently a methyl or ethyl group.

28. A polymerizable composition according to claim 24 further comprising:
at least one monomer of formula (I):

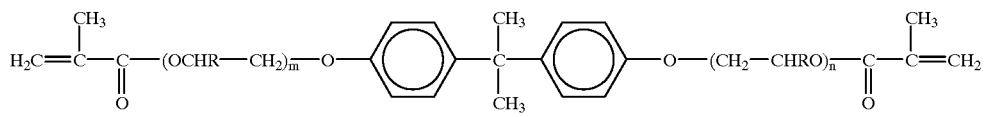
in which R=H or CH$_3$ and m and n are independently 1 or 2.
29. A polymerizable composition according to claim 25 further comprising:
at least one aromatic monovinyl monomer of formula (II):
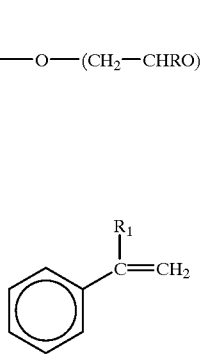
in which R$_1$=H or CH$_3$.
* * * * *